(No Model.)
2 Sheets—Sheet 1.
J. J. SUCKERT.
COOLING AND SEPARATING A LUBRICATING AGENT FROM A COMPRESSED GAS, AND LIQUEFACTION OF GASES AND PRODUCTION OF REFRIGERATION.
No. 320,305.
Patented June 16, 1885.
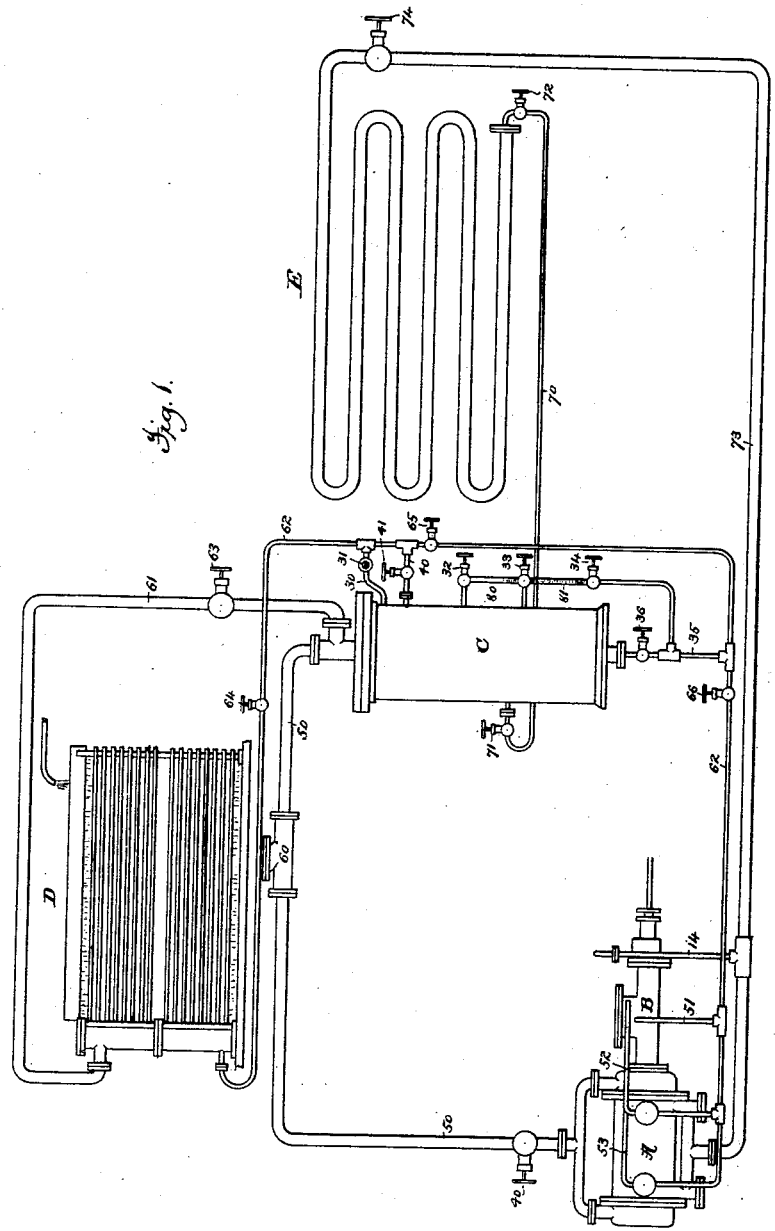

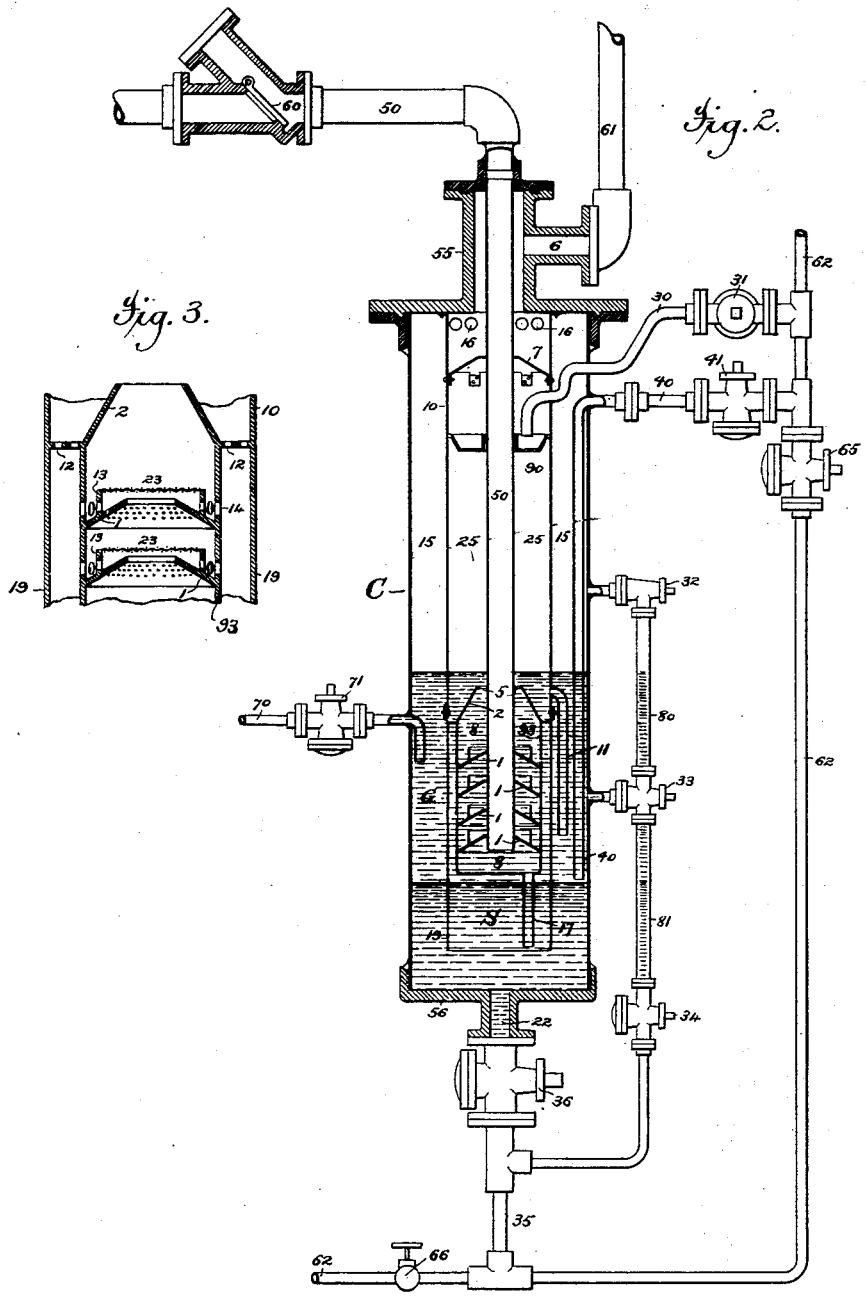

UNITED STATES PATENT OFFICE.

JULIUS J. SUCKERT, OF RIDGEWOOD, NEW JERSEY.

COOLING AND SEPARATING A LUBRICATING AGENT FROM A COMPRESSED GAS, AND LIQUEFACTION OF GASES AND PRODUCTION OF REFRIGERATION.

SPECIFICATION forming part of Letters Patent No. 320,305, dated June 16, 1885.

Application filed April 24, 1885. (No model.)

*To all whom it may concern:*

Be it known that I, JULIUS J. SUCKERT, a citizen of the United States, residing at Ridgewood, county of Bergen, and State of New Jersey, have invented certain new and useful Improvements in Cooling and Separating a Lubricating Agent from a Compressed Gas, and for the Liquefaction of Gases and Production of Refrigeration, fully described and represented in the following specification and the accompanying drawings, forming a part of the same.

My invention relates to that class of mechanism used for the compression and liquefaction of gases, wherein a sealing or lubricating agent is used to seal the valves and moving parts, and it is essential to effect a complete separation of such sealing or lubricating agent, or the vapor of such agent, from the gas under compression prior to the admission of the compressed gas or liquefied gas to some portion of the system of circulation. Its especial use is in connection with machinery for ice-making and producing refrigeration; but it is also applicable for other purposes.

In the earliest experiments where a sealing or lubricating agent was used for the purposes specified a vertical tank or chamber was interposed between the compressor and the condenser, and the compressed gas intermingled with the sealing or lubricating agent was discharged into this tank, trusting to the weight of the liquid to prevent its passage beyond the tank. The fact that much of the sealing or lubricating agent was subdivided into minute particles and into froth and foam by the pressure exerted upon it and by the heat developed by such pressure, and was carried mechanically with the compressed gas into the condenser, and thence to the heat-absorbing coils, was not realized. When this became known, further efforts were made to arrest it, and a system of retarding-plates was affixed alternately or irregularly in the tank used to effect a separation; but this did not prove effectual and the efficiency of the apparatus was materially impaired by the continued passage of large quantities of the sealing or lubricating liquid to the condenser and heat-absorbing coils. Further experiments developed the fact that the sealing or lubricating agent was not only carried over mechanically, as described, but, in addition thereto, a vapor was developed from such agent, by the heat of compression, which passed to the condenser, was there liquefied and carried to the heat-absorbing coils, collecting and congealing therein in considerable quantities, thus removing the sealing and lubricating agent from points of easy access, where required, to points not readily accessible, where its presence greatly reduced the capacity of the apparatus to absorb heat. This led to the introduction of a separating-tank between the condenser and the heat-absorbing coil, and to an expensive and complex system for collecting, cooling, and returning the sealing or lubricating liquid preparatory to its reintroduction to the compressor. This improvement, though advantageous, does not effect a complete separation of the sealing or lubricating liquid from the compressed gas, which result is accomplished for the first time by the present invention.

Heretofore, as stated, those using a sealing or lubricating liquid in gas-compressors have endeavored to effect a separation of such liquid from the compressed gas or the liquefied gas by the interposition of tanks in different parts of the system of circulation, depending entirely upon the weight of the liquid to separate it from the compressed gas, and the difference in specific gravity to separate it from the liquefied gas. The vapor developed by the heat of compression from the sealing or lubricating liquid has always been introduced into the condenser and condensed therein with the compressed gas, thus impairing the efficiency of the condenser by lining or covering the inner surfaces of its passages with a poor conductor, and preventing to a considerable extent the transmission of heat. The cooling of the sealing or lubricating liquid which is not vaporized and cooled in the condenser has been effected in a separate cooling-coil, either exposed, with water trickling over it, or submerged in a tank. This plan adds to the expense, risk, and complication of the apparatus. The quantity of vaporized sealing or lubricating agent passing into the condenser varies with the final temperature of the gas being compressed, with the size of the discharge-pipe, and other conditions, which may more or less affect a vaporization or foamy condition of the agent. As a result, constant care and vigilance on the part of an attendant is necessary to discharge the lubricant from the final receptacle interposed between the condenser and the heat-absorbing coils to prevent its passage into such coils in large quantities. The accumulation of the sealing or lubricating liquid in this receiver is determined by means of a glass gage, and it frequently happens that the orifices in the gage become stopped, thereby rendering it impossible to determine with any degree of accuracy the amount of liquid within the tank, and increasing the probability of its passage to the heat-absorbing coils.

Another feature, which predominates in all the methods hitherto applied in which a gas is compressed and liquefied, either with or without the use of a sealing or lubricating liquid, is the passage of the gas to the condenser as a superheated vapor. The temperature which the gas possesses in excess of that existing within the condenser having been caused by the heat developed by the compression of the gas within the compressor, this surplus heat must be abstracted from the gas before it can liquefy; or, in other words, the gas must be reduced from the condition of a superheated vapor to that of a saturated vapor before liquefaction can take place, and to do this a greater proportion of condensing-surface is required than is required for the liquefaction of a saturated vapor.

The necessity for using lubricating agents or liquids (for if not liquids, they become so under the heat of compression) with high boiling-points is another very serious objection to the old system in vogue. The object sought in using such agents or liquids is to limit the vaporization of such liquids by the heat developed by the compression of the gas to a minimum quantity, and thereby render the necessary discharge of the liquid accumulating in the final separating-receiver less frequent than would be necessary if liquids having lower boiling-points were used.

The objection to the use of sealing or lubricating liquids having high boiling-points is based upon the fact that in case the chilled liquefied gas overflows from the heat-absorbing coils and returns to the compressor, which frequently occurs, and is technically called "freezing back," the liquid introduced into the compressor to seal and lubricate its working parts becomes chilled or reduced to a low temperature and solidifies or hardens, losing all its sealing or lubricating properties, and not only endangers the moving or working parts, but causes excessive friction and allows an escape of the gas or refrigerating agent past the piston-rod stuffing-box.

Efforts have been made to prevent freezing back by utilizing the heat-absorbing qualities of the returning chilled liquefied gas to cool the water required for the condensation or liquefaction of the gas, and thereby vaporize the returning liquefied gas and allow it to return to the compressor in the form of a gas and at a temperature above that required to chill and solidify the sealing or lubricating liquid; but this, as well as the majority of methods employed for preventing freezing back, accomplishes the purpose only by sacrificing a proportionate amount of the refrigerating capacity of the apparatus. By using a sealing or lubricating liquid having a low boiling-point, and which will not solidify at the temperature of the returning liquefied gas, the above difficulties can, in a great measure, be overcome and the expensive apparatus be replaced by something more effective and economical.

The object of this invention is to obviate the objections above set forth, and not only to obtain a positive and complete separation of the sealing or lubricating agent or liquid from the compressed gas or from the liquefied gas prior to its introduction into the expansion-coil, but to effect the separation from the compressed gas before such gas is admitted to the condenser; to avoid the use of a separate cooling-coil for cooling the sealing and lubricating agent or liquid and the expense and complication incidental thereto; to avoid occupying space in the condenser for cooling the sealing or lubricating liquid; to lessen the size and cost of the condenser by avoiding the necessity of its use for the liquefaction of a superheated vapor; to use the condenser only for the liquefaction of saturated vapors; to increase the efficiency of the condenser by preventing the admission therein of a sealing or lubricating agent or liquid; to abstract the heat of compression from the compressed gas and the sealing or lubricating agent or liquid by the vaporization of a liquefied gas; to reduce the temperature of a superheated gas or vapor to that of a saturated vapor by the vaporization of a part of its own liquid while exposed to the working or liquefying pressure of the gas; to so construct the apparatus that a constant renewal of the liquefied gas vaporized in abstracting the heat of compression from the compressed gas and the lubricant may take place, thereby rendering the operation continuous and enabling the storage of a quantity of liquefied gas, through which the compressed gas is forced to pass prior to its entrance into the condenser, thereby thoroughly washing it and liquefying and separating any vaporized sealing or lubricating liquid it may contain; to combine in one receiver or tank the separation of the sealing or lubricating liquid from the compressed gas, the cooling of both to a temperature equal to that existing within the condenser, and the storage of liquefied gas for use in heat-absorbing coils; to permit the use of a sealing or lubricating liquid having a low boiling-point, and that will not combine with or dissolve to any great extent in the liquefied gas, or be solidified or congealed in case the chilled liquefied gas returns to the compressor; to simplify and reduce the cost of construction of gas-liquefying apparatus, and to make the process of separation and cooling automatic and continuous and not dependent upon the care and watchfulness of an attendant.

To this end my invention consists in, first, the process of separating a sealing or lubricating agent, liquid, or vapor from a compressed gas or vapor, and liquefying a gas, which process consists in first abstracting the heat of compression, or a part thereof, from such gas and the intermingled sealing or lubricating agent by the vaporization of liquefied gas brought in contact therewith and operating to liquefy and, by such liquefaction, to separate the vaporized and subdivided parts of the sealing or lubricating agent from the compressed gas and the vaporized liquefied gas, prior to the liquefaction of such gases, and then liquefying such gases in a condenser and returning the resulting liquid to the receptacle containing the liquefied gas and the sealing or lubricating agent, separated, except at their line of contact, by their difference in specific gravity, as will hereinafter appear; second, the process of abstracting the heat of compression, or a part thereof, from a gas or vapor under compression, which process consists in first exposing a liquefied gas to a pressure in excess of the pressure of the gas entering the compression-chamber, and while under such pressure abstracting the heat of compression, or a part thereof, from the compressed gas, prior to its entrance into the condenser, by the vaporization of a part of such liquefied gas, as will hereinafter appear; third, the process of abstracting the heat of compression, or a part thereof, from a sealing or lubricating agent or liquid, its froth and vapor, and of liquefying such froth and vapor, which process consists in first exposing a liquefied gas to a pressure in excess of the pressure of the gas entering the compressor to be compressed, and while under such pressure abstracting the heat of compression, or a part thereof, from the sealing or lubricating agent or liquid, and liquefying the froth and vapor of such agent by the vaporization of a liquefied gas, as will hereinafter appear.

The invention further consists of the peculiar construction, arrangement, combination, and operation of the several parts with each other, as shown in the drawings and described in the specification, as will hereinafter appear.

Figure 1 is a perspective view of one practical embodiment of the invention in elevation. Fig. 2 is a sectional view of the tank or receiver wherein the vaporized and subdivided sealing or lubricating liquid is liquefied and separated from the compressed gas. Fig. 3 is an enlarged view of a part of the inner gas-washing cylinder or receiving-chamber, showing the perforated plates for separating the vapors into a finely-divided condition to bring it more intimately in contact with the liquefied gas and the openings for the ingress and egress of the gas and liquids.

The apparatus illustrated for the carrying out of this invention embodies a double-acting compressor, A, an auxiliary pump, B, a separating tank or receiver, C, a condenser, D, and an expansion or heat-absorbing coil, E. The double-acting auxiliary pump B operates to circulate the sealing or lubricating liquid charged with liquefied gas, and to inject the same into the compression-chambers of the compressor.

The discharge-pipe 50 of the compressor A leads to the cooling or separating tank or receiver C, and is supplied with a cock, 40, and a check-valve, 60, which latter is used to automatically prevent the return of the liquefied gas from the receiver C or the condenser D to the compressor A.

The receiver C is provided for cooling the sealing and lubricating liquid and condensing the vapor, and serves also as a storage-reservoir for holding the liquefied gas and the sealing or lubricating liquid. It is connected with the condenser D by a supply-pipe, 61, having a cock, 63, and the liquefied gas is returned from the condenser D to the receiver C by means of a main return-pipe, 62, that has controlling-cocks 64 65 66 and is supplied with branch pipes 30 and 40, that enter through the side of said receiver, and with a pipe, 35, that enters through the bottom of the receiver. This pipe 62 also extends beyond the branch pipe 35, so as to convey the sealing or lubricating liquid charged with liquefied gas from the receiver C to the auxiliary pump B and compressor A through branch pipes 51, 52, and 53. The pipe 30 has a cock, 31, the pipe 40 a cock, 41, and the pipe 35 a cock, 36, by which the passage through said pipes is controlled.

The liquefied gas is conveyed from the receiver C to the expansion or heat-absorbing coil E by means of a pipe, 70, supplied with cocks 71 72, and the gas developed by the vaporization of the liquefied gas admitted to the coil E is conveyed back to the compressor A by means of the suction or return pipe 73, having a cock, 74.

The receiver C is supplied with a glass gage in two sections, 80 81, that taps the receiver C at two points and connects below with the pipe 35, which gage is provided with three stopcocks, 32 33 34, whereby the height of any liquid in the receiver C, when charged, may be determined.

The construction of the receiver C will best be understood from Figs. 2 and 3. This tank or receiver consists of a cylindrical case having a cast head, 55, through a cap of which the discharge-pipe 50 is introduced and extended to the chamber 8. This head 55 has a lateral duct, which forms the inlet 6 for the supply-pipe 61, leading to the condenser, and communicates with the interior of the tank or receiver through an annular opening in the head 55 around the pipe 50.

The tank or receiver has a cast bottom, 56, that is provided with a duct forming an outlet, 22, communicating with the pipe 35 for the discharge of any liquid from the tank, but more particularly for the discharge of the sealing or lubricating liquid S through the pipes 35 and 62 to the auxiliary pump and compressor.

Internally the tank or receiver C is divided, by a sheet-iron cylinder, 10, attached to the head 55 and having an open bottom and certain walls and plates, into three chambers: one, the discharge-chamber 15, so designated in consequence of the sealing or lubricating liquid being discharged therefrom; another, the receiving-chamber 8, so designated for the reason that it receives all of the gas, vapor, or liquid discharged by the compressor; and a third, the shower-chamber 25, so called because the gases liquefied in the condenser are returned to this chamber in a shower through the pipe 30 and a sprinkler.

The discharge-chamber 15 is constituted by the space formed between the walls of the main cylinder or casing and the cylinder 10. The receiving-chamber 8 is formed by a cage-like structure suspended within the cylinder 10, near its lower end. It consists of a circular body, 93, attached to the inner walls of the cylinder 10 by a perforated annulus, 12. It is made with a dome-like top, 2, having an opening, 5, concentric with the pipe 50, and from its bottom (otherwise closed) projects a short open pipe, 17. Internally it is provided with many dome-like baffle-plates, 1, placed a little distance apart, (see Fig. 3,) secured to the walls of the body 93, just below perforations 14 therein, and at a short distance from said walls. Each plate has a collar, 13, with perforated sides projecting upwardly a short distance within the body 93, and that portion of the baffle-plates which is inclosed by the collars 13 is perforated. These baffle-plates may be of sheet or cast iron, or any other metal not affected by the gas used, and they will be placed far enough apart to provide room for sheets of wire-gauze, 23, or other suitable material, placed on top of the collar 13, or laid over the baffle-plates, so as to have a stratum of liquefied gas between each plate and sheet. The holes in the baffle-plates will generally be larger than the meshes of the sheet 23, but any suitable relative arrangement can be made, as with some kinds of sealing and lubricating liquid a smaller mesh can be used than with others.

The opening 5, which might be perforations, is for the purpose of permitting the passage of the compressed gas upward, while the object of the baffle-plates is to retard the passage of the sealing or lubricating liquid and the compressed gas; to divide, subdivide, and break up into minute divisions the particles of sealing or lubricating liquid, thereby forcing it into more intimate contact with the liquefied gas; and to liquefy the vapor of such sealing or lubricating liquid by detaining it in contact with the liquefied gas. The purpose of the pipe 17 is to permit the escape of the sealing or lubricating agent, which is in liquid form, from the chamber 8 to the lower part of the tank or receiver C.

The shower-chamber 25 is formed by the space inclosed between the pipe 50 and the cylinder 10 above the chamber 8, and is provided with a sprinkler, 90, which consists of a pan with perforated bottom secured at a high point in the chamber and arranged to receive the discharge from the pipe 30. Above the sprinkler this chamber 25 is provided with a baffle-plate, 7, perforated like the others, but is not provided with a sheet of wire, and the upper extremity of the cylinder 10 is perforated with holes 16, that form communications between the chambers 15 and 25 and 8, whereby the pressures are equalized in all the chambers, thus enabling the internal divisions to be made of much lighter material.

The extension 19 of the cylinder or tube 10 operates to suppress the commotion caused by the discharge of the compressed gas and the sealing or lubricating liquid from the discharge-pipe, and also serves to prevent the lubricant which may be collected between the dome-top 2 of the chamber 8 and the cylinder 10 from coming in contact with the main body of the liquefied gas except as it passes through the apertures 12 12 to S. It also prevents the lubricant that may condense upon the baffle-plates, and which passes through the apertures 13 and 14, from coming in contact with that part of the liquefied gas which is likely to be drawn from the tank or receiver to the expansion-coils through the pipe 70.

The chambers 15 25 are made to communicate by a pipe, 11, and the pipe 40 is extended inside of the receiver or tank C, so that the liquefied gas it receives from the pipe 62 on its way from the conductor will be conveyed to the chamber 15 if the sprinkling device is not used.

The apparatus having been charged with the necessary quantity of liquefied gas and sealing or lubricating liquid, the operation will be as follows: The gas entering the compressor through its suction-inlets from the pipe 73 is compressed and forced, together with the sealing or lubricating liquid injected into the compressor by the auxiliary pump B, past the discharge-valves of the compressor into the discharge-pipe 50, thence past the check-valve 60 into the receiver C. As shown in the sectional view, Fig. 2, the pipe 50 is carried down within the receiver, and its lower end is submerged in the liquefied gas (indicated by the light shading G) in the chamber 8. The superheated gas intermingled with the partially-vaporized sealing or lubricating liquid discharged from the compressor is thereby brought in direct contact with the cold liquefied gas G, retained at a temperature equal to that existing within the condenser, and reduced to the temperature of the liquefied gas, and the vaporized sealing or lubricating liquid is condensed and liquefied. The heat abstracted from the superheated gas and the warm and partially-vaporized sealing or lubricating liquid is entirely spent in the vaporization of a definite quantity of the liquefied gas, the quantity depending entirely upon the temperature of the superheated gas and that of the lubricating liquid prior to their contact with the liquefied gas. The vapor developed from the liquefied gas G, as well as the gas issuing from the discharge-pipe 50, are both compelled to pass through a system of perforated plates 1 in the chamber 8. These plates are covered with wire-gauze, and, so covered, operate to divide and break up the gases and vapors passing through them into a finely-separated condition, thus bringing such gases and vapors more intimately in contact with the liquefied gas, which completely washes out and frees them from the vaporized sealing or lubricating liquid which they may have retained. The gases then pass together as a saturated vapor through the opening 5 in the funnel or dome shaped head 2 of the chamber 8 into the chamber 25, and thence around the sprinkler 90, through another funnel-shaped perforated retarding-plate, 7, to the annular space in the head of the tank or receiver, and thence through the outlet 6 to the pipe 61, and thence to the condenser D, Fig. 1, where it liquefies. The liquefied gas so condensed then flows through the pipes 62 and 30 or 40 to the receiver C. It may all be admitted to the receiver through the pipe 30 by opening the cock 31, in which case it is rained or showered through the sprinkler 90 into the chamber 25, Fig. 2, where it meets and washes the compressed and vaporized gas after its passage through a body of liquefied gas and while on its way to the condenser.

A special advantage of the system of showering the liquefied gas, as shown, is that in case the body of liquefied gas G is drawn low by passing it off with great rapidity to the expansion-coil the showering offers an additional and effective means of washing the vapor of the sealing and lubricating liquid from the compressed gas. As the liquefied gas accumulates and rises in the chamber 25 it overflows through the pipe 11 to the chamber 15.

The especial object of the several inclosures or chambers and the perforated plates is to effect more perfect separation by obstructing the movement of the gas and liquid forcibly injected into the chamber 8, and by such obstruction and division to gradually quell the commotion caused. The extension or casing 19 is attached to the cylinder 10 and around the chamber 8, to serve a similar purpose.

If the liquefied gas received from the condenser be admitted to the receiver C through the pipe 40, as may be done by closing the cock 31 and opening the cock 41, such liquefied gas then passes in the opposite direction through pipe 11 to the chamber 8. The major part of the sealing or lubricating liquid discharged from pipe 50 settles, in consequence of its greater specific gravity, on the bottom of the chamber 8 and flows through the open tube 17 to the bottom of the receiver C. By the agitation of the liquefied gas and the condensation of a part of the vaporized lubricating agent on the perforated plates 1 1 1 1 a certain amount of the lubricant is carried upward in the chamber 8, and is either deposited on the outside of the perforated plates or in the space formed by the funnel or dome shaped top 2 of chamber 8 and the outer cylinder or casing, 10. It flows from these various settling-points through the orifices 12, 13, and 14, Fig. 3, into the annular space formed by the chamber 8 and the extension or casing 19, or the lower continuation of the cylinder 10, and eventually settles upon and intermingles with the sealing or lubricating liquid contained in the lower portion of the tank C, whence it is conveyed by means of the passage 22 and the pipe 62 to the auxiliary pump B, Fig. 1. The bottom of the extension or casing 19 being open, the same pressure must exist in the annular space between the cylinder 10 and its extension 19 and the shell of the receiver as within the cylinder 10 itself. The liquefied gas, as well as the sealing or lubricating liquid, will therefore retain the same level in all the annular spaces, compartments, or chambers formed by the cylinder 10, its extension 19, the chamber 8, and the shell of the receiver C. The pipe 70, communicating with the receiver C, conveys the liquefied gas separated from the sealing or lubricating liquid to the heat-absorbing coil E, Fig. 1, where it is allowed to vaporize under a reduced pressure, and thereby produce refrigeration.

The object of the different valves and connections shown in Fig. 1, and not described in the beforegoing statement, is to enable the operator to remove the gas or liquid from any one part of the apparatus to another for storage in case repairs are necessary and to direct the flow of the gas and liquid, as described.

It may be stated here that the gas-compressor patented by me July 22, 1884, is represented, for the reason that it is believed better results can be obtained by its use in combination with the subjects-matter of this invention than with other compressors; but better results can be obtained with this system of cooling and separating with other compressors than can be obtained without the system. It may, however, be observed that, in consequence of the improved construction of the compressor which was the subject of the Letters Patent above named, its use will be advantageous, because less heat of compression will have to be removed either from the compressed gas or the sealing or lubricating agent in the tank or receiver operating as a cooling, separating, and storage tank, in consequence of the partial absorption of the heat of compression, by the vaporization of the gas or liquefied gas in the gas-compressor, from the lubricant introduced therein during the act of compression. By the introduction of a lubricant charged with gas or liquefied gas and its subsequent vaporization in the compressor the temperature of the compressed gas discharged from the compressor is very much reduced, and the extent of its reduction will depend on the quantity of the lubricant that is so introduced and discharged. It will therefore be observed that by using this compressor it becomes an easy matter to reduce the temperature of the compressed gas from that of a superheated vapor to that of a saturated vapor, and the saving in condenser-surface will be a corresponding gain.

Any construction of condenser D may be employed—such, for instance, as coils or return-pipes, cooled by immersion or a shower.

Having fully explained my invention, what I claim as new, and desire to secure by Letters Patent of the United States, is—

1. The process of separating a sealing or lubricating agent, liquid or vapor, from a compressed gas or vapor, and liquefying a gas, which process consists in first abstracting the heat of compression, or a part thereof, from such gas and the intermingled sealing or lubricating agent by the vaporization of liquefied gas brought in contact therewith and operating to liquefy and, by such liquefaction, to separate the vaporized and subdivided parts of the sealing or lubricating agent from the compressed gas and the vaporized liquefied gas, prior to the liquefaction of such gases, and then liquefying such gases in a condenser and returning the resulting liquid to the receptacle containing the liquefied gas and the sealing or lubricating agent, separated, except at the line of contact, by their difference in specific gravity, substantially as described.

2. The process of abstracting the heat of compression, or a part thereof, from a gas or vapor under compression, which process consists in first exposing a liquefied gas to a pressure in excess of the pressure of the gas entering the compression-chamber, and while under such pressure abstracting the heat of compression, or a part thereof, from the compressed gas, prior to its entrance into the condenser, by the vaporization of a part of such liquefied gas, substantially as described.

3. The process of abstracting the heat of compression, or a part thereof, from a sealing or lubricating agent or liquid, its froth and vapor, and of liquefying such froth and vapor, which process consists in first exposing a liquefied gas to a pressure in excess of the pressure of the gas entering the compressor to be compressed, and while under such pressure abstracting the heat of compression, or a part thereof, from the sealing or lubricating agent or liquid and liquefying the froth and vapor of such agent by the vaporization of a liquefied gas, substantially as described.

4. The combination, with a gas-compressor and a condenser, of a tank or receiver and connecting-pipes, when the said tank or receiver is supplied with a body of liquefied gas, operating to abstract the heat of compression from a sealing or lubricating agent and its vapor within said tank by the vaporization of a part of the liquefied gas, substantially as described.

5. The combination, with a gas-compressor and a condenser, of a tank or receiver and connecting-pipes, when the said tank or receiver is supplied with a liquefied gas operating to cool a sealing or lubricating agent and to liquefy the vapor of such sealing or lubricating agent by the vaporization of a liquefied gas maintained at the liquefying pressure, substantially as described.

6. The combination, with a gas-compressor and a condenser, of a tank or receiver and connecting-pipes, when the said tank or receiver has a supply of liquefied gas which operates to cool a sealing or lubricating agent and its vapor and to liquefy such vapor by the vaporization of the liquefied gas, or a part thereof, and the vapor so developed by the vaporization of the liquefied gas is maintained at the liquefying pressure, substantially as described.

7. The combination, with a gas-compressor and a condenser, of a tank or receiver and connecting-pipes, when the said tank or receiver has a supply of liquefied gas which operates to cool a sealing or lubricating agent and its vapor and to liquefy such vapor by the vaporization of the liquefied gas, or a part thereof, and the said sealing or lubricating agent and its liquefied vapor when cooled are maintained or continued under the liquefying pressure, substantially as described.

8. The combination, with a gas-compressor and a condenser, of a tank or receiver and connecting-pipes, when the said tank or receiver is supplied with a liquefied gas which operates to cool a sealing or lubricating agent and its vapor and to liquefy such vapor by the vaporization of a liquefied gas, and the vapor so developed by the vaporization of the liquefied gas is maintained at the liquefying pressure until returned to the condenser, substantially as described.

9. The combination, with a gas-compressor and a condenser, of a tank or receiver and connecting-pipes, when the said tank or receiver is supplied with a liquefied gas which operates to abstract the heat of compression from a compressed gas by the vaporization of the liquefied gas, or a part thereof, under the liquefying pressure when the vapor developed by the vaporization of the liquefied gas is also maintained at the working or liquefying pressure until introduced into the condenser, substantially as described.

10. The combination, with a gas-compressor and a condenser, of a tank or receiver and connecting-pipes, when the said tank or receiver is provided with a liquefied gas operating to abstract the heat of compression from a compressed gas discharged from a compression-chamber by the vaporization of a liquefied gas under the liquefying pressure, substantially as described.

11. The combination of a gas-compressor, a condenser, a tank or receiver and connecting-pipes, when the said tank or receiver is provided with a liquefied gas operating to abstract the heat of compression from a compressed gas by the vaporization of a liquefied gas, and the compressed gas so cooled is liquefied in the condenser, substantially as described.

12. The combination, with a gas-compressor, a condenser, and connecting-pipes, of a tank or receiver supplied with a body of liquefied gas and interposed between the compressor and the condenser, when constructed, connected, and arranged to receive a compressed gas intermingled with a sealing or lubricating liquid, and the vapor of such liquid in contact with a liquefied gas operating by such contact and its vaporization to liquefy the vapor of the sealing or lubricating liquid and to separate it from a compressed gas or a liquefied gas, except at the line of contact, substantially as described.

13. The combination, with a gas-compressor, a condenser, and connecting-pipes, of a tank or receiver arranged and operating to receive a compressed gas and the vapor of a sealing or lubricating agent or liquid in contact with a liquefied gas which operates to separate the vapor of the sealing or lubricating agent or liquid from the compressed gas by the washing of such gas or vapor with the liquefied gas, substantially as described.

14. The combination, with a gas-compressor, a condenser, and connecting-pipes, of a tank or receiver constructed and arranged to receive a compressed gas and a sealing or lubricating agent or the vapor of such agent from a gas-compressor, when the said tank has a supply of liquefied gas, maintained at the liquefying pressure, operating to liquefy the vapor of a sealing or lubricating liquid by the washing of such vapor with the liquefied gas, substantially as described.

15. The combination, with a gas-compressor, a condenser, and connecting-pipes, of a tank or receptacle having a supply of liquefied gas operating by its vaporization to reduce the temperature of a compressed gas or other vapor when the said tank is provided with an outlet and conduit by which the vapor developed by the vaporization of the liquefied gas is conveyed to a condenser, substantially as described.

16. The combination, with a gas-compressor, a condenser, and connecting-pipes, of a tank or receptacle constructed, arranged, and operating to wash a gas or vapor by showering a liquefied gas in contact with such gas or vapor, substantially as described.

17. The combination, with a gas-compressor, a condenser, and connecting-pipes, of a tank or receptacle having a liquefied gas operating by its vaporization to reduce the temperature of a liqid, a gas, or a vapor admitted therein, when the whole is connected, arranged, and operates to discharge the vapor of the liquefied gas to the condenser, to condense the same, and to return a liquefied gas from such condenser to the said tank or receptacle, substantially as described.

18. The combination, with a gas-compressor, a condenser, and connecting-pipes, of a tank or receptacle having a liquefied gas operating by its vaporization to reduce the temperature of a compressed gas admitted therein, when the whole is connected, arranged, and operates to discharge the compressed gas and the vapor of the liquefied gas to a condenser, to condense the same, and to return a liquefied gas from such condenser to the said tank or receptacle, substantially as described.

19. The combination of a gas-compressor with a tank or receptacle supplied with a liquefied gas and a sealing or lubricating liquid, both maintained under the working or liquefying pressure, a condenser and connecting-pipes, when the said tank or receptacle receives the compressed gas, and a sealing or lubricating liquid discharged from the compressor, and the whole is constructed, arranged, and operates to cool such sealing or lubricating liquid and to separate it from the compressed gas prior to the passage of the compressed gas to the condenser, substantially as described.

20. The combination of a gas-compressor, a condenser, a tank or receiver, and connecting-pipes, when the whole is constructed, arranged, and operates to utilize the said tank for cooling a sealing or lubricating liquid, for a storage-reservoir for the liquefied gas and a sealing or lubricating liquid, and for the separation of a vapor from a sealing or lubricating liquid from the compressed gas, substantially as described.

21. The combination, with a gas-compressor, of a tank or receptacle receiving a compressed gas and a sealing or lubricating liquid, a condenser, and connecting-pipes, when the said tank or receptacle is provided with a receiving-chamber having perforated baffle or retarding plates arranged and operating to settle and quiet the disturbed liquid introduced therein and to separate a sealing or lubricating liquid from a compressed gas or from a liquefied gas, except at the line of contact of the sealing or lubricating liquid and the liquefied gas, substantially as described.

22. The combination of a gas-compressor with a tank or receptacle wherein a sealing or lubricating liquid and its vapor are separated from a compressed gas, a condenser, and connecting-pipes, when the said tank operates as a storage-reservoir for the sealing or lubricating liquid under the working or liquefying pressure, and to furnish therefrom a supply of the sealing or lubricating liquid charged with gas or a liquefied gas, which is introduced to the gas-compressor under a pressure in excess of the pressure of the gas entering the compressor to be compressed, substantially as described.

23. The combination, with a gas-compressor, of a tank or receptacle for a liquid, a condenser, and connecting-pipes, when the said tank or receptacle is under the working or liquefying pressure of a gas-liquefying apparatus and has a chamber operating as a receiving-chamber and another chamber operating as a discharge-chamber, which communicate with each other by apertures or conduits adapted to the equalization of pressures in or between such chambers, substantially as described.

24. The combination, with a gas-compressor, of a tank or receptacle for a liquid, a condenser, and connecting-pipes, when the said tank or receptacle is provided with a receiving-chamber and a discharge-chamber, which communicate with each other by apertures operating to equalize the pressures within such chambers, and the said tank connects with the discharge-pipe of a gas-compressor and receives therefrom a compressed gas and a sealing or lubricating liquid or the vapor of such liquid into one of the said chambers, substantially as described.

25. The combination, with a gas-compressor, the discharge-pipe of such compressor, a condenser, and connecting-pipes, of a tank or receptacle arranged in its relation to the discharge-pipe of the compressor to receive therefrom a compressed gas and a sealing or lubricating liquid or the vapor of such liquid when the said tank or receptacle is provided with a receiving-chamber having a conduit permitting the escape of the sealing or lubricating liquid to a discharge-chamber, a conduit for the passage of liquefied gas to a discharge-chamber, and one or more conduits for the escape of the compressed gas through and from the liquefied gas to a condenser, substantially as described.

26. A tank or receptacle receiving compressed gas and a sealing or lubricating liquid or the vapor of such liquid from the discharge-pipe of a compressor, when the said tank or receptacle is provided with one or more perforated plates operating to divide a chamber of said tank or receptacle into compartments and to divide or subdivide the gas, vapor, or the lubricant by their passage through such plates, substantially as described.

27. A tank or receptacle receiving compressed gas and a sealing or lubricating liquid from the discharge-pipe of a compressor, when the said tank or receptacle is provided with a receiving-chamber having an outlet for the escape of the sealing or lubricating liquid, and a series of funnel-shaped perforated plates placed one above another, with a stratum of liquefied gas interposed between such plates, all arranged and operating to baffle and retard the passage of the compressed gas and the vapor of the sealing and lubricating liquid through the liquefied gas, and to separate the liquefied vapor of the sealing or lubricating liquid from the compressed gas, in combination with a gas-compressor, a condenser, and connecting-pipes, substantially as described.

28. A tank or receptacle receiving a compressed gas and a sealing or lubricating liquid, or the vapor of such liquid, within a receiving-chamber having an outlet for the escape of the sealing or lubricating liquid, and a series of perforated baffle-plates placed one above another, with a stratum of liquefied gas interposed between such plates, when the said chamber is also provided with a series of sheets of material having a fine mesh or small spaces between its strands or web, as wire-gauze, and such sheets are connected with and arranged above the said perforated baffle-plates, between which sheets a liquefied gas is also interposed, the whole operating to retard the compressed gas and the vapor of the sealing or lubricating liquid, to divide and subdivide such gas and vapor into minute divisions, and to liquefy such vapor and separate it from the compressed gas, in combination with a gas-compressor, a condenser, and connecting-pipes, substantially as described.

29. The combination of a gas-compressor, its discharge-pipe, a tank or receptacle into which the compressed gas and a sealing or lubricating liquid or the vapor of such liquid is discharged, a condenser, and connecting-pipes, when the whole is constructed, arranged, and operates to separate the vapor of a sealing or lubricating liquid from a compressed gas by forcing such compressed gas in contact with a shower of liquefied gas, but in a direction different from that taken by the showering liquefied gas, substantially as described.

30. The combination of a gas-compressor, having the gas compressed in its compression-cylinder reduced in temperature by the expansion or vaporization of a gas or liquefied gas, with a tank or receptacle connected therewith, and into which the compressed gas of such compressor is discharged, when such compressed gas is further reduced in temperature within the said tank or receptacle by the vaporization of a liquefied gas operating to reduce the temperature of a superheated gas or vapor to that of a saturated vapor prior to the entrance of such gas or vapor to a condenser, a condenser, and connecting-pipes, substantially as described.

31. A receiving or separating tank having a receiving-chamber, as 8, and perforated baffle-plates, as 1 1 1 1, in combination with a gas-compressor, a condenser, and connecting-pipes, all substantially as described.

32. A receiving or separating tank having a receiving-chamber, as 8, perforated baffle-plates, as 1 1 1 1, and an enveloping-tube with an open bottom, as 19, arranged to form a passage-way between said tube and the receiving-chamber, in combination with a gas-compressor, a condenser, and connecting-pipes, all substantially as described.

33. A receiving or separating tank having a receiving-chamber with an outlet at or near its bottom, having the discharge-pipe of a gas-compressor entering the receiving-chamber, a device for showering a liquefied gas, as 90, and a conduit with suitable stop-cock communicating with a condenser, in combination with a gas-compressor, a condenser, and connecting-pipes, all substantially as described.

34. A tank or receptacle interposed between a gas-compressor and a condenser, which is provided with a liquid operating to submerge or to seal an outlet of the discharge-pipe of the gas-compressor, when the said tank is in combination with a condenser and the whole are connected by pipes, substantially as described.

35. A tank or receptacle interposed between a gas-compressor and a condenser, which is provided with a liquid operating to submerge or to seal an outlet of the discharge-pipe of the gas-compressor and to wash and to cool a compressed gas discharged from such pipe, when the said tank is in combination with a condenser and the whole are connected by pipes, substantially as described.

36. A tank or receptacle interposed between a gas-compressor and a condenser, which is provided with a liquid operating to submerge or to seal an outlet of the discharge-pipe of the gas-compressor and to liquefy vapor of a sealing or lubricating liquid introduced therein, or to separate a sealing or lubricating liquid or its vapor from a compressed gas prior to the passage of such gas to a compressor, when the said tank is used in combination with a gas-condenser and the whole are connected by pipes, substantially as described.

In testimony whereof I have hereunto set my hand in the presence of two subscribing witnesses.

JULIUS J. SUCKERT.

Witnesses:
JAS. J. KENNEDY,
T. H. PALMER.